United States Patent
Nakatani et al.

[11] Patent Number: 5,378,391
[45] Date of Patent: Jan. 3, 1995

[54] LIQUID CRYSTAL FILM

[75] Inventors: Kenji Nakatani; Satoshi Igarashi, both of Hino; Hiroo Inata, Iwakuni; Horinori Matsuda, Hino, all of Japan

[73] Assignee: Teijim Limited, Osaka, Japan

[21] Appl. No.: 848,362

[22] Filed: Mar. 9, 1992

[30] Foreign Application Priority Data

Nov. 7, 1991 [JP] Japan .................. 3-318577

[51] Int. Cl.⁶ .................. C09K 19/52; C09K 19/54; C09K 19/00
[52] U.S. Cl. .................. 252/299.01; 252/299.5; 428/1
[58] Field of Search .................. 252/299.01, 299.5; 428/1

[56] References Cited

U.S. PATENT DOCUMENTS

| | | | |
|---|---|---|---|
| 4,671,618 | 7/1967 | Wu et al. | 359/52 X |
| 4,869,847 | 9/1989 | Leslie et al. | 252/299.01 |
| 4,890,902 | 1/1990 | Doane et al. | 359/75 |
| 4,891,152 | 1/1990 | Miller et al. | 252/299.01 |
| 4,938,568 | 7/1990 | Margerum et al. | 359/51 X |
| 4,994,204 | 2/1991 | Doane et al. | 252/299.01 |
| 5,011,624 | 4/1991 | Yamagishi et al. | 252/299.5 |
| 5,116,528 | 5/1992 | Mullen et al. | 252/299.01 |
| 5,200,107 | 4/1993 | Piermathe et al. | 252/299.01 |
| 5,211,876 | 5/1993 | Vaz et al. | 252/299.01 |

FOREIGN PATENT DOCUMENTS

WO89/06371 7/1989 WIPO.

Primary Examiner—Robert L. Stoll
Assistant Examiner—C. Harris
Attorney, Agent, or Firm—Wenderoth, Lind & Ponack

[57] ABSTRACT

A liquid crystal film comprising a light-transmitting resin matrix and liquid crystal droplets dispersed therein, characterized in that (a) an average droplet diameter R (micrometers) of the liquid crystal droplets is 1 to 2.5 micrometers, (b) a thickness d (micrometers) of the liquid crystal film is 5 to 50 micrometers, (c) an applied voltage $V_{0.7}$ (V) is less than 0.8 d when light transmittance is 70%, (d) a driving voltage $V_{90}$ (V) in d=10 micrometers and an average droplet diameter R (micrometers) of the liquid crystal droplets meet the following relationship $$V_{90} > 1\,(R-1.8)^2 + 4,$$

(e) saturated light transmittance ($T_{100}$) in d=10 micrometers is at least 80% and light transmittance ($T_{7V}$) in applying a voltage of 7 V is at least 90% of $T_{100}$. Said liquid crystal film can be utilized in a liquid crystal display device.

19 Claims, 1 Drawing Sheet

Fig. 1

LIQUID CRYSTAL FILM

This invention relates to a liquid crystal film, and more specifically to a liquid crystal film comprising a light-transmitting resin matrix useful in a liquid crystal display device wherein a liquid crystal phase can be changed between transparency and non-transparency depending on the on-off operation when the liquid crystal film is held between two electrodes and a voltage is applied to the electrodes, and a liquid crystal phase dispersed therein in the form of liquid crystal droplets.

Fergason, et al. have proposed a liquid crystal structure which, in a liquid crystal film obtained by microcapsulating liquid crystal molecules and dispersing the capsules in a resin film as liquid crystal droplets, utilizes non-transparency provided by scattering of light owing to the liquid crystal droplets and transparency provided by orientation of the liquid crystal molecules in the liquid crystal droplets by application of an electric field, as well as a process for producing same (U.S. Pat. No. 4,435047). Some have been put to practical use. However, the proposed process is intricate in production steps because it includes a microcapsulating step.

Meanwhile, Kent State University (Ohio, USA) has proposed in PCT International Laid-open Nos. WO85/04262 and WO87/01822 that a liquid crystal layer is formed by dispersing liquid crystal fine droplets in a light-transmitting thermosetting resin matrix upon phase separation from a mixed solution of the thermosetting resin and the liquid crystal molecules. Actually, however, a liquid crystal structure having satisfactory durability in application to a so-called light modulating window, for example, a window of a large area against which sunlight directly strikes has not been provided yet.

Moreover, ordinary liquid crystal structures require an AC voltage of about 100 V for orientation of liquid crystals, and thus suffer a serious defect in the display usage, such as a high driving voltage. Development of liquid crystal structures that can be actuated with a low voltage when used as display devices in the aspects of designing of the driving circuit and improvement in display picture quality has been demanded.

It is an object of this invention to provide a liquid crystal film for use in a liquid crystal display device which is simple in structure and excellent in durability and which can be driven with a low voltage.

Another object of this invention is to provide an electro-optical device using such a liquid crystal film.

The other objects and characteristics of this invention will be clarified by the following description.

In accordance with this invention, there is provided a liquid crystal film comprising a light-transmitting resin matrix and liquid crystal droplets dispersed therein, characterized in that (a) an average droplet diameter R (micrometers) of the liquid crystal droplets is 1 to 2.5 micrometers, (b) a thickness d (micrometers) of the liquid crystal film is 5 to 50 micrometers, (c) an applied voltage $V_{0.7}$ (V) is less than 0.8 d when light transmittance is 70%, (d) a driving voltage $V_{90}$ (V) in d=10 micrometers and average droplet diameter R (micrometers) of the liquid crystal droplets meet the following relationship $$V_{90} > 1(R-1.8)^2 + 4,$$

(e) saturated light transmittance ($T_{100}$) in d=10 micrometers is at least 80% and light transmittance ($T_{7V}$) in applying a voltage of 7 V is at least 90% of $T_{100}$.

The liquid crystal film of this invention will be described in more detail below.

The liquid crystal film of this invention is of a structure wherein liquid crystal fine droplets are uniformly dispersed as a liquid crystal phase in a light-transmitting resin matrix.

The liquid crystal film of this invention allows a non-transparent state to appear by scattering of light with the liquid crystal phase dispersed in a resin matrix and random orientation of liquid crystal molecules. It is therefore advisable that the average diameter of liquid crystal droplets forming the liquid crystal phase is larger than the wavelength of a visible light. Thus, the liquid crystal droplets forming the liquid crystal dispersion phase of the liquid crystal film in this invention has advantageously an average droplet diameter R (micrometers) of usually 0.8 to 5 micrometers, more preferably 1 to 2.5 micrometers. It is advisable that each dispersed liquid crystal droplet has as uniform a droplet diameter as possible. The droplet diameter distribution is desirously such that at least 80% of the dispersed liquid crystal droplets have a droplet diameter of 0.7–1.3, preferably 0.8–1.2 of the average droplet diameter (R).

The average droplet diameter and the droplet diameter distribution of the liquid crystal droplets in the liquid crystal film are determined as follows. The surface of the liquid crystal film is observed via a polarizing microscope with a magnification of 1,000 X or more, and the liquid crystal droplet diameter in any 100-micrometer square is measured. When a liquid crystal film is formed such that it is held between two electrode substrates, one of the electrode substrates is stripped off and the liquid crystal droplets appearing on the surface are measured as above.

The average droplet diameter and the droplet diameter distribution are found on the basis of the measured results.

Moreover, the content of the liquid crystal droplets in the liquid crystal film of this invention is not strictly limited but can vary with the usage of the liquid crystal display device. In order to form a liquid crystal film having good light shielding property and durability, the content of the liquid crystal droplets is usually 40 to 80% by weight, preferably 50 to 70% by weight.

The thickness of the liquid crystal film can vary with the type of the resin matrix and/or the liquid crystal, the usage of the final liquid crystal device, etc. In case of the liquid crystal film of this invention, its thickness d (micrometers) is usually 5 to 50 micrometers, preferably 8 to 20 micrometers.

The liquid crystal film provided by this invention is excellent in on-off properties (i.e, light transmittance in applying a voltage, light shielding property in not applying a voltage, etc.), an applied voltage, a driving voltage, a driving speed and durability, and is therefore quite useful as a liquid crystal display device.

For instance, in the liquid crystal film of this invention, an applied voltage $V_{0.7}$ (V) ($V_{0.7}$: voltage when light transmittance is 70% of incident light) is less than 1.0 d (d is a thickness (micrometers) of the liquid crystal film), preferably 0.8 d or less. On the other hand, light transmittance in not applying a voltage is usually 10% or less, preferably 5% or less. Thus, the liquid crystal film of this invention is actuated with a relatively low applied voltage and has such a characteristic that a difference between transparency and non-transparency in the on-off operation, i.e., contrast is great.

Talking of the driving voltage, the liquid crystal film of this invention meets the following relationship between the driving voltage $V_{90}$ (V) with the thickness d=10 micrometers of the film and the average droplet diameter R (micrometers) of the liquid crystal droplets.

$$V_{90} > 1(R-1.8)^2 + 4,$$

preferably $$V_{90} > 2(R-1.8)^2 + 4,$$

and it can be driven with a low voltage.

Moreover, in the liquid crystal film of this invention, saturated light transmittance ($T_{100}$) with the thickness d=10 micrometers is at least 80%, preferably at least 82%, more preferably at least 85%, and light transmittance ($T_{7V}$) in applying a voltage of 7 V is at least 80%, preferably at least 85%, more preferably at least 90% of saturated light transmittance ($T_{100}$). Thus, the liquid film of this invention can exhibit excellent light transmittance characteristics in applying a voltage.

In this invention, light transmittance and the driving voltage of the liquid crystal film are defined as follows.

Two transparent electroconductive films each comprising a 125 micrometer-thick polyethylene terephthalate film and formed thereon, a 200 Å-thick ITO (In SnO) film and having light absorption (600 nm) of 1.0% are used as substrates. A liquid crystal film is held between the transparent electroconductive layers thereof. The above properties are measured as the whole values of said structure. Light transmittance of the liquid crystal film is a value found by measuring the structure at 600 nm via a spectral transmittance measuring device (MCPD-1000) manufactured by Ohtsuka Denshi K. K. When various AC voltages (50 Hz) are applied to the transparent electroconductive layers, light transmittance becomes unchanged with more than a certain voltage. At this time, light transmittance is called saturated light transmittance. The voltage shown when light transmittance is 90% of saturated light transmittance is defined to be the driving voltage ($V_{90}$).

It is advisable that the light-transmitting resin constituting the matrix phase of the liquid crystal film in this invention is a resin having refractive index substantially equal to ordinary light refractive index of the liquid crystal constituting the dispersion phase, especially an acrylic polymer. The term "substantially equal" here referred to means that the resin matrix has refractive index within ±0.05 of ordinary light refractive index of the liquid crystal.

The light-transmitting resin having such optical characteristics is preferably a fluorine-containing resin, especially a fluorine-containing acrylic resin. The content of the fluorine atom in such a fluorine-containing resin is usually 1 to 20% by weight, preferably 3 to 15% by weight, more preferably 5 to 10% by weight.

The liquid crystal film having the foregoing characteristics in this invention can be produced by a so-called "phase separation" method. On that occasion, one significant point is selection of monomer(s) for producing the light-transmitting resin as a matrix phase.

Thus, in this invention, it is advisable to use a monomer mixture comprising (a) a polymerizable monomer having surface activity which is effective for phase separation of a liquid crystal as the liquid droplets having the above average particle diameter and (b) a hydrophilic polymerizable monomer having a hydroxyl group for effectively exhibiting surface activity of the monomer (a). The monomer mixture can further contain, optionally and preferably, (c) a fluorine-containing polymerizable monomer for making refractive index of the matrix phase match that of the liquid crystal.

The polymerizable monomer (a) having surface activity includes a monomer obtained by introducing a radical polymerizable unsaturated group, e.g. a (meth)-acrylate group in an end of a nonionic surface active substance [usually, a chemical substance having in a molecule a lipophilic (hydrophobic) moiety (e.g., a long-chain alkyl group) and a hydrophilic moiety (e.g., —CH$_2$CH$_2$O—$_4$H— with a terminal hydroxyl group in an amount sufficient to disperse or dissolve the lipophilic moiety in water, and not accompanying ionization in the dispersing or dissolving].

An example of such a monomer (a) is an acrylic monomer represented by formula (I)

wherein
R$^1$ denotes a hydrogen atom or a methyl group,
R$^2$ denotes an alkylene group having 2 to 3 carbon atoms,
R$^3$ denotes a hydrophobic group, and
n is an integer of 2 to 12, preferably 3 to 8.

In formula (I), examples of the C$_{2-3}$ alkylene group denoted by R$^2$ are —CH$_2$CH$_2$—, —CH$_2$CH$_2$CH$_2$— and —CH(CH$_3$)CH$_2$—. The hydrophobic group denoted by R$^3$ can be a lipophilic (hydrophobic) group ordinarily contained in a nonionic surface active substance. Examples thereof are linear, branched, alicyclic, and aromatic hydrocarbons having 5 to 20, preferably 6 to 15 carbon atoms, such as alkyl groups (e.g., hexyl, octyl, decyl, lauryl, cetyl and stearyl), aryl groups (e.g., phenyl, biphenyl and naphthyl), and aralkyl or alkylaryls (e.g., benzyl and nonylphenyl); and mixtures thereof.

Thus, the most preferable acrylic monomer of formula (I) is a phenoxyoligoethylene oxide acrylate monomer (hereinafter abbreviated at times as "EOA") represented by the formula wherein
R$_4$ denotes a hydrogen atom or an alkyl group having 1 to 10 carbon atoms, preferably 3 to 8 carbon atoms, and
n is an integer of 2 to 12, preferably 3 to 8.

Examples of the alkyl group having 1 to 10 carbon atoms, denoted by $R^4$, are methyl, ethyl, propyl, butyl, pentyl, nonyl, isopropyl, isobutyl and isopentyl groups.

(phenoxy-tetraethylene oxide acrylate), (p-nonylphenoxy-ethylene oxide acrylate), (p-nonylphenoxy-tetraethylene oxide acrylate), and (p-nonylphenoxy-octaethylene oxide acrylate)

On the other hand, the hydrophilic polymerizable monomer (b) having the hydroxyl group, which can be used together with the polymerizable monomer (a) having surface activity includes a compound having at least 1, preferably 1 to 5 hydroxyl groups and a radical polymerizable unsaturated group in a molecule. It is a compound having a solubility parameter of 11 to 13 measured according to a method of Fedors described in Polymer Eng. Sci., 14(2) p.147 (1974). A concrete example thereof is a hydroxyl group-containing (meth)acrylate monomer (hereinafter abbreviated at times as "HOA") represented by formula (III)

$$CH_2=\overset{R^1}{\underset{|}{C}}-COO-R^5-OH \qquad (III)$$

wherein $R^1$ denotes a hydrogen atom or a methyl group, and
$R^5$ denotes an alkylene group having 2 to 5 carbon atoms.

The alkylene group having 2 to 5 carbon atoms, denoted by $R^5$ in formula (III) can be either linear or branched.

Examples thereof are

—CH$_2$CH$_2$—, —CH$_2$CH$_2$CH$_2$—, —CH$_2$CHCH$_3$,
$\qquad\qquad\qquad\qquad\qquad\qquad\qquad\qquad\qquad$ |

Of these,

—CH$_2$CHCH$_3$
$\quad\quad$ | is preferable.

Examples of HOA represented by formula (III) are:

CH$_2$=CHCOOCH$_2$CH$_2$OH (2-hydroxyethyl acrylate)

$\qquad\qquad\qquad\qquad\quad$ OH
$\qquad\qquad\qquad\qquad\quad$ |
CH$_2$=CHCOOCH$_2$CHCH$_3$ (2-hydroxypropyl acrylate)

$\qquad\qquad\qquad\qquad\qquad\quad$ OH
$\qquad\qquad\qquad\qquad\qquad\quad$ |
CH$_2$=CHCOOCH$_2$CHCH$_2$CH$_3$ (2-hydroxybutyl acrylate), and their corresponding methacrylates.

The ratio of the polymerizable monomer (a) having surface activity and the hydrophilic polymerizable monomer (b) containing the hydroxyl group can vary with the type of the monomer and/or the type of the liquid crystal, and the properties required of the matrix of the liquid crystal film. The monomer (a)/monomer (b) molar ratio is usually 2/1 to ½ preferably, 1.5/1 to 1/1.5, more preferably 1.2/1 to 1/1.2.

Moreover, the fluorine-containing polymerizable monomer (c) used optionally can be a compound having in a molecule at least 1 fluorine atom and a radical polymerizable unsaturated bond. It is preferably a compound wherein refractive index of a homopolymer obtained by homopolymerizing the monomer is usually 1.3 to 1.45, preferably 1.35 to 1.40. Such a fluorine-containing polymerizable monomer can be, for example, a fluorine-containing (meth)acrylate monomer (hereinafter abbreviated at times as "FA") represented by formula (IV)

$$CH_2=\overset{R^1}{\underset{|}{C}}-COO-CH_2-R_f \qquad (IV)$$

wherein

$R^1$ denotes a hydrogen atom or a methyl group, and
$R_f$ denotes a mono- or poly-functional group having 1 to 8 carbon atoms and containing at least 1 fluorine atom.

In formula (IV), the mono- or poly-fluoroalkyl group having 1 to 8 carbon atoms and containing at least 1 fluorine atom, which is denoted by $R_f$, may be either linear or branched. Examples there are —CF$_2$H, —CF$_3$, —CF$_2$CF$_2$H, —C$_4$F$_4$H$_5$, —CF$_2$CF$_2$CF$_2$CF$_2$H, $\qquad$ OH
$\qquad$ |
—CHCH$_2$-(CF$_2$)$_4$ and —C$_8$F$_{17}$.

The group having 3 to 5 carbon atoms is preferable.

Examples of FA represented by formula (IV) are:
CH$_2$=CHCOOCH$_2$—CF$_3$ (2,2,2-trifluoroethyl acrylate),
CH$_2$=CHCOOCH$_2$—(CF$_2$)$_2$H (2,2,3,3-tetrafluoropropyl acrylate),
CH$_2$=CHCOOCH$_2$—(CF$_2$)$_4$H (2,2,3,3,4,4,5,5-octafluoropentyl acrylate),
CH$_2$=CHCOOCH$_2$CH$_2$—(CF$_2$)$_7$CF$_3$ (perfluorooctylethyl acrylate), and their corresponding methacrylates.

The amount of the fluorine-containing polymerizable monomer is not strictly limited and can vary with the types of the other comonomers or the type of the liquid crystal. It is generally advisable to use said monomer in such an amount that refractive index of the formed matrix polymer is substantially equal to that of the liquid crystal of the dispersion phase. Moreover, it is advantageous to use said monomer in such an amount that the content of the fluorine atom in the formed matrix polymer is usually 1 to 20% by weight, preferably 3 to 15% by weight, more preferably 5 to 10% by weight.

The monomer mixture that can be used to form the light-transmitting resin matrix of the liquid crystal film in this invention may further contain, if required, a polyfunctional polymerizable monomer (d) to increase curability of the resin matrix phase.

The polyfunctional polymerizable monomer includes a compound having a structure free from a bonding unit unstable to light and heat and to which two or more polymerizable groups, e.g., (meth)acrylate groups are bound. An example of the polyfunctional polymerizable monomer (d) is a polyfunctional (meth)acrylate monomer represented by formula (V)

wherein $R^1$ denotes a hydrogen atom or a methyl group,

Y denotes an organic residue of m valence having 5 to 40 carbon atoms and optionally containing 1 to 15 hetero atoms selected from nitrogen, oxygen, sulfur and halogen atoms, and m is an integer of 2 to 6, preferably 3 to 4.

The other example thereof is triallyl isocyanurate.

In formula (V), examples of the organic residue of m-valence denoted by Y are:

m=2 to 3 ethylene glycol di(meth)acrylate, trimethylolpropane tri(meth)acrylate, pentaerythritol tri(meth)acrylate and tris(acryloxyethyl) isocyanurate m=4 to 5 pentaerythritol tetraacrylate and urethane acrylates (U-1244A, U-1264A, U-1084 AM and U-4HA: trademarks for products of Shin Nakamura Kagaku K.K.).

m=6 urethane acrylates (U-1226A, U-1236A, U-1246A, U-1266A, U-2006AX, U-456HT and U-6HA: trademarks for products of Shin Namakura Kagaku K.K.) and di-(2,2,2-tri(acryloxymethyl)ethyl p-phenylenedicarbamate Of these, pentaerythritol types such as pentaerythritol tri(meth)acrylate and pentaerythritol penta(meth)acrylate, and a cyanurate type such as tris(acryloxyethyl) isocyanurate are preferable.

Thus, examples of the polyfunctional (meth)acrylate represented by formula (V) are:

($CH_2$=$CHCOOCH_2$)$_4$—C (pentaerythritol tetra acrylate), and (tris(acryloxyethyl) isocyanurate).

The amount of the polyfunctional polymerizable monomer is not strictly limited either and can vary with properties required of the matrix phase. It is usually by weight, preferably 3% by weight, based on the total weight of the monomers. The lower limit of said amount is usually 0.1% by weight.

The addition of the polyfunctional monomer can give an effect of improvement in light shielding property of the liquid crystal film.

When the effect of improvement in light shielding property is expected, it is advisable that the amount of the polyfunctional polymerizable monomer is usually 0.5 to 2% by weight. When the amount is less than 0.5% by weight or more than 2% by weight, light shielding property comes to decrease at times.

The foregoing monomers (a)–(d) are mixed in predetermined proportions and are polymerized with the addition of a polymerization initiator. The polymerization initiator can be either a heat polymerization initiator or a photopolymerization initiator depending on the polymerization method. It is also possible to perform the polymerization by at least two steps of heat polymerization and ultraviolet irradiation polymerization using both of the above initiators. Examples of the heat polymerization initiator available at that time are known peroxide compounds typified by peroxyesters such as tert-butyl peroxypivalate and lauryl peroxide, and diacyl peroxides. Examples of the photopolymerization initiator are acetophenone-type photopolymerization initiators such as hydroxyacetophenone ("DAROCURE 1173": a trademark for a product of Merck), alpha-aminoacetophenone ("IRGACURE 907": a trademark for a product of Ciba Geigy), and diethoxyacetophenone; and thioxanthone-type photopolymerization initiators such as benzophenone and isobutylthioxanthone.

The amount of the polymerization initiator is not critical and can properly vary with its type. It is usually 0.1 to 5% by weight, preferably 0.5 to 3% by weight based on the total weight of the monomer mixture.

The monomer mixture can furthermore contain, if required, a sensitizer, a chain transfer agent and a dye in amounts ordinarily used.

On the other hand, the type of the liquid crystal used to form the dispersion phase is not particularly limited, and liquid crystals widely used in a liquid crystal display device are available. A nematic liquid crystal is generally suitable.

Especially, in order to fully exhibit non transparency by random orientation of the liquid crystal molecules, a liquid crystal having a great difference between ordinary light refractive index and extraordinary light refractive index is generally desirable. In order to prompt liquid crystal orientation with a low applied voltage, a liquid crystal having great dielectric anisotropy is generally desirable. Considering these characteristics, a liquid crystal wherein positive dielectric anisotropy is high and a difference between ordinary and extraordinary light refractive indexes is 0.2 or more is desirable as the liquid crystal component constituting the liquid crystal dispersion phase.

As the liquid crystal component to meet such conditions, a cyanobiphenyl-type liquid crystal compound is taken, but it is, of course, not critical. A phenylcyclohexane-type liquid crystal compound is also available. These liquid crystal compounds can be used as a liquid crystal composition of two or more of them depending on the usage, as has been so far done.

Examples of the cyanobiphenyl-type liquid crystal compound preferably used to form the liquid crystal dispersion phase of the liquid crystal film in this invention are as follows.

wherein $R_6$ denotes an alkyl or alkoxy group having 1 to 12 carbon atoms.

Examples of a $C_{1-12}$ alkyl group denoted by $R_6$ are methyl, ethyl, propyl, butyl, pentyl, hexyl, heptyl, octyl, nonyl and decyl. Of these, propyl and heptyl are preferable. Examples of the $C_{1-12}$ alkoxy group are alkoxy groups corresponding to the above alkyl groups.

The above cyanobiphenyl-type liquid crystal compounds can be used either singly or in combination. As a liquid crystal component using such a liquid crystal compound, a liquid crystal E-8 (a trademark for a product of Merck) can be taken.

The liquid crystal film of this invention using the above monomer mixture and the liquid crystal (composition) can be produced by a phase separation method known per se [see U.S. Pat. No. 4,101,207, and PCT International Laid-open Nos. WO85/04262 and WO87/01822]. For instance, the production of the liquid crystal film can be conducted by adding the liquid crystal (composition), the polymerization initiator, and other optional component(s) to the monomer mixture to form a monomer/liquid crystal composition in a liquid form, holding this liquid composition between the two opposite electroconductive electrode layers of substrates with the two opposite electroconductive electrodes spaced apart from each other, at least one of the substrates being a transparent substrate having a transparent electroconductive electrode layer, and then conducting a polymerization reaction of the liquid composition. For increasing uniformity of the thickness of the formed liquid crystal film, the liquid crystal composition can contain polystyrene beads or silicon oxide beads (which serve as a spacer) having a diameter corresponding to the thickness of the intended liquid crystal film in such a small amount that does not substantially influence properties of the liquid crystal film.

In the polymerization reaction, curing is conducted in the presence of, e.g., 1% by weight of the heat photopolymerization initiator at a temperature higher than a nematic-isotropic phase transition temperature of the liquid crystal, e.g., higher than 90° C. for more than 10 minutes, or in the presence of, e.g., 1% by weight of the photopolymerization initiator at room temperature or a temperature higher than a nematic-isotropic phase transition temperature, e.g., higher than 90° C. for several minutes or several tens of minutes upon irradiating actinic light, e.g., ultraviolet light (high pressure mercury lamp).

More preferably, heat polymerization and photopolymerization are continuously carried out to be able to provide a still better liquid crystal film. On this occasion, it is possible that heat polymerization is conducted under the aforesaid conditions and ultraviolet curing is then conducted below room temperature.

Thus, the liquid crystal display device can be obtained having a structure that the liquid crystal film of this invention is held between the opposite electrode substrates with the opposite electrodes.

The liquid crystal display device and the process for producing same will be described in more detail referring to FIG. 1 attached hereto.

Figure 1:
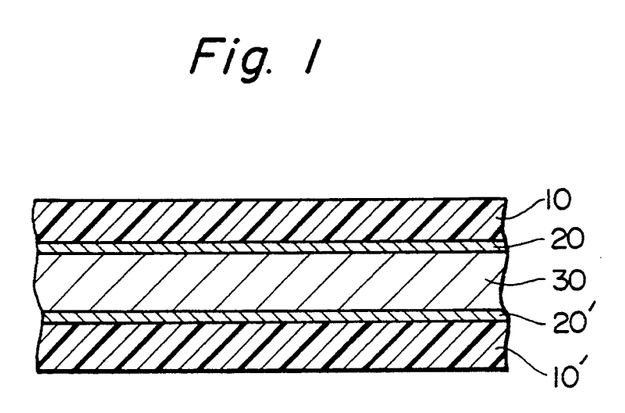
FIG. 1 is a sectional view of liquid crystal display device using the liquid crystal film of this invention.

The liquid crystal display device using the liquid crystal film of this invention has a structure, as shown in FIG. 1 (sectional view), that a liquid crystal film (30) according to this invention is held between a pair of opposite electrode layers (20), (20') of substrates (10), (10') having said electrode layers, said substrates being opposite to each other in spaced-apart relationship and at least one thereof being a transparent substate (10) [the other electroconductive electrode layer (20') and/or substrate (10') may be either transparent or non-transparent].

As a material of the transparent substrate, polyester films having excellent transparency are desirous, and glass sheets or other transparent high-molecular films are also available. For example, an aluminum deposited polyester film is available as the material of the non-transparent substrate.

As the electroconductive electrode layer mounted on the surface of such a substrate, an indium oxide film that may contain small amounts of impurities such as tin, etc is desirous. Films of metallic oxides such as zinc oxide and titanium oxide, thin films of metals such as gold and platinum, and laminates obtained by holding metallic thin films between transparent electroconductive films are also available.

One of the electrode layers may be a non-transparent electroconductive electrode layer of high reflectance made of a thick electroconductive metallic film. On this occasion, of course, the substrate may not be transparent.

The electrode layer can be mounted on a substrate as an electroconductive electrode layer having resistance of 500 Ω/□ or less, preferably 300 Ω/□ or less by a physical method known per se, such as sputtering.

The liquid crystal display device can be produced by providing the (transparent) electroconductive electrode layer (20) or (20') on the transparent substrate (10) or (10') in a manner known per se such as sputtering, coating the above liquid monomer/liquid crystal composition onto the (transparent) electroconductive electrode layer (20) or (20') to a uniform thickness by a bar coder or a printing method, laminating the other (transparent) substrate (10') or (10) having the other (transparent) electroconductive electrode layer (20') or (20) such that the (transparent) electroconductive electrode layer (20') or (20) is contacted with a coated layer (30) to obtain a laminate, then conducting heating and/or irradiating the laminate with ultraviolet light under ultraviolet irradiation device using, e.g., a mercury lamp as a light source, and/or conducting heating to cure the layer of the monomer/liquid crystal composition.

The liquid crystal display device containing the liquid crystal film of this invention which is formed as mentioned above can be utilized in various electrooptical devices such as a liquid crystal projector, a liquid crystal TV set, and a liquid crystal display instrument.

This invention is illustrated more specifically by the following Examples.

EXAMPLES 1 AND 2

A laminate obtained by using a 125-micrometer thick polyester film as a transparent substrate and laminating thereon an indium oxide film containing a small amount of tin and having a thickness of about 200 Å as a transparent electroconductive layer by sputtering was used as a substrate.

Nonylphenol-n-ethylene oxide acrylate (made by Toagosei K.K.) was used as a monomer of surface activity, and 2-hydroxyacrylate as a hydrophilic monomer. IRGACURE 907 (a trademark for a product of Ciba Geigy) as a polymerization initiator was added in an amount of 2.5% by weight based on the weight of the monomer mixture. The monomer mixture was mixed with a cyanobiphenyl liquid crystal ("E-8": a trademark for a product of Merck). A spacer ("MICROPEARL": a trademark for a product of Sekisui Fine Chemical K.K.) having a diameter of 8 to 10 micrometers was added to the mixed solution to form a coating solution. The coating solution was held between the above substrates, and ultraviolet light was irradiated for 5 minutes to form a liquid crystal film.

Properties of the liquid crystal film, i.e., light transmittance ($T_0$) when a voltage is not applied, saturated light transmittance ($T_{100}$) when a voltage is applied and a film turns transparent, an applied voltage ($V_{90}$) required to show light transmittance of 90% of $T_{100}$, and a liquid crystal droplet diameter (d) were measured.

Regarding light transmittance, light transmittance at 600 nm was measured by means of a spectral transmittance measuring device (MCPD-1000) with an optical fiber manufactured by Otsuka Denshi K.K.

As a voltage applied to the liquid crystal film, an AC voltage of 50 Hz was used.

Regarding the diameter of the liquid crystal droplet, the film was delaminated, the surface was observed with a microscope, and an average value was found therefrom.

The results obtained by using 2-hydroxyethyl acrylate or 2-hydroxybutyl acrylate as a hydrophilic monomer are shown in Table 1.

TABLE 1

| Surface active monomer n = ethylene oxide chain length | Hydrophilic monomer | Liquid crystal | $T_0$ | $V_{90}$ | d(μm) |
| --- | --- | --- | --- | --- | --- |
| n = 4 28 wt. % | 2-Hydroxybutyl acrylate 7 wt. % | E-8 65 wt. % | 13% | 11 V | 2.2 |
| n = 4 26 wt. % | 2-Hydroxyethyl acrylate 7 wt. % | E-8 67 wt. % | 8% | 8 V | 1.8 |

From the above tabulated results, it follows that when using the surface active monomer and the hydrophilic monomer alone, the films having the common properties are obtained.

EXAMPLES 3 TO 5

Example 1 was repeated except that a fluorine-containing monomer was further added to the monomer mixture. $T_0$, $V_{90}$, d and $T_{100}$ were then measured with the results shown in Table 2.

TABLE 2

|  | Example 3 | Example 4 | Example 5 |
| --- | --- | --- | --- |
| Surface active monomer |  |  |  |
| Nonylphenyl-4-ethylene oxide acrylate | 21.1 wt % | 21.1 wt % | 26.4 wt % |
| Hydrophilic monomer |  |  |  |
| Hydroxypropyl acrylate | 5.3 wt % | 5.3 wt % | 6.6 wt % |
| Fluorine-containing monomer |  |  |  |
| Octafluoropentyl acrylate (Kyoeisha Yushi Kogyo K.K.) | 6.6 wt % | 0 | 0 |
| 3-Perfluorobutyl-2- (Daikin Kogyo K.K.) | 0 | 6.6 wt % | 0 |
| Liquid crystal E-8 | 67 wt % | 67 wt % | 67 wt % |
| $T_0$ | 8% | 7% | 9% |
| $T_{100}$ | 83% | 83% | 77% |
| $V_{90}$ | 5.5 V | 5.0 V | 7.0 V |
| d | 1.5 μm | 1.6 μm | 1.8 μm |

The results in Table 2 reveal that when the fluorine-containing monomer is added (Examples 3 and 4), $T_{100}$ increases and the driving voltage decreases compared to Example 5.

EXAMPLE 6

Refractive index (n) was measured on the film obtained by curing only the monomer mixture formed with the addition of the fluorine-containing monomer, and was found to be lower than that in Example 5 as indicated below.

Film made only of the resin in Example 3 n = 1.494

Film made only of the resin in Example 5 n = 1.508

EXAMPLES 7 TO 9

Liquid crystal films were formed as in Examples 3–4 except that a polyfunctional monomer was further added to the monomer mixture. Properties of the liquid crystal films are shown in Table 3.

In the formation of said films, the temperature of the atmosphere was set at 86° C. which was above the nematic-isotropic phase transition temperature of the liquid crystal because the mere addition of the polyfunctional monomer makes $V_{90}$ shift to a high voltage driving side compared to no addition thereof.

TABLE 3

|  | Example 7 | Example 8 | Example 9 |
| --- | --- | --- | --- |
| Surface active monomer |  |  |  |
| Nonylphenol-4-ethylene oxide acrylate | 20.4 wt % | 20.4 wt % | 20.4 wt % |
| Hydrophilic monomer |  |  |  |
| 2-hydroxypropyl acrylate | 5.3 wt % | 5.3 wt % | 5.3 wt % |
| Fluorine-containing monomer |  |  |  |
| Octafluoropentyl acrylate (Kyoeisha Yushi Kogyo | 6.3 wt % | 6.3 wt % | 6.3 wt % |

TABLE 3-continued

| | Example 7 | Example 8 | Example 9 |
|---|---|---|---|
| K.K. | | | |
| Polyfunctional monomer | | | |
| Pentaerythritol-4-acrylate (Kyoeisha Yushi Kogyo K.K.) | 1.0 wt % | 0 | 0 |
| Trisacryloxyethyl isocyanurate (GX8430 Daiichi Kogyo Seiyaku K.K.) | 0 | 1.0 wt % | 0 |
| U-1226A (Urethane oligomer, Shinnakamura Kagaku K.K.) | 0 | 0 | 1.0 wt % |
| Liquid crystal E8 | 66.7 wt % | 66.7 wt % | 66.7 wt % |
| $T_0$ | 5% | 4% | 5% |
| $V_{90}$ | 6.0 V | 5.5 V | 5.5 V |
| d | 1.6 μm | 1.7 μm | 1.7 μm |

From the results in Table 3, it becomes apparent that the addition of the polyfunctional monomer improves $T_0$.

EXAMPLES 10 AND 11

In the same way as in Example 7, a liquid crystal film was formed at 86° C. using pentaerythritol 4-acrylate as a polyfunctional monomer (Example 10), and a liquid crystal film was formed at 75° C. without the addition of the polyfunctional monomer (Example 11). Both the films were left to stand in a hot air drier of 62° C. for a long period of time, and then changes of $T_O$ and $V_{90}$ with time were measured at room temperature, which was made a durability test.

Properties before and after the durability test are shown in Table 4.

TABLE 4

| Example No. | Time in durability test | $T_0$ (%) | $V_{90}$ (V) |
|---|---|---|---|
| 10 | 0 | 5 | 7.2 |
| | after 1000 hrs | 7 | 7.5 |
| 11 | 0 | 8 | 6.1 |
| | after 1000 hrs | 68 | 6.2 |

From the results in Table 4, it becomes apparent that the addition of the polyfunctional monomer can improve durability at a high temperature of 62° C.

EXAMPLE 12

The methods, the monomers and the liquid crystal in Examples 1 to 9 were used, and the monomer mixing ratio, the liquid crystal mixing ratio and the curing conditions were selected. The diameter of the liquid crystal droplet and the driving voltage were then plotted. As a result, the measured points were found to be distributed within a range surrounded by $V_{90} > 2$ $(R-1.8)^2 + 4$ (R = thickness (micrometer) of the liquid crystal film) and $V_{0.7} < 0.8$ d (a thickness (d) = 10 micrometers).

EXAMPLE 13

In the same way as in Example 7, a monomer solution comprising a surface active monomer, a hydrophilic monomer, a fluorine-containing monomer and a polyfunctional monomer was mixed with 0.5% by weight, based on the weight of the resin, of an organic peroxide ("PERBUTYL PV": a trademark for a product of Nippon Oils and Fats Co., Ltd.) and 0.5% by weight, based on the weight of the resin, of a photopolymerization initiator ("IRGACURE 907": a trademark for a product of Ciba Geigy). Further, 66% by weight of a liquid crystal (E-8: a trademark for a product of Merck) and a small amount of a spacer ("MICROPEARL": a trademark for a product of Sekisui Fine Chemical K.K.) were added to form a coating solution.

The coating solution was held between the substrates, and first heat-cured at 86° C. for 10 minutes. After cooling, curing was further conducted by irradiating ultraviolet light at room temperature for 5 minutes to form a liquid crystal film.

Properties of the film thus cured at two stages are shown in Table 5. The film was a film having excellent durability with no change in a 70° C. durability test.

For comparison, properties of a film formed by heat-curing only are also shown in Table 5. From the results in Table 5, it is found that the film obtained by two-stage curing has better durability than the film obtained by heat-curing only.

TABLE 5

| | Properties | Initial value | In slow cooling to room temperature after test at 70° C. for 1 hour |
|---|---|---|---|
| Example 13 | $T_0$ | 7% | 7% |
| | $V_{90}$ | 7 V | 7 V |
| Comparison (heat-curing only) | $T_0$ | 7% | 10% |
| | $V_{90}$ | 7 V | 15 V |

What is claimed is:

1. In a liquid crystal film comprising a light-transmitting resin matrix and liquid crystal droplets dispersed therein, the improvement wherein
    (a) the average droplet diameter R (micrometers) of the liquid crystal droplets is 0.8 to 5 micrometers, and at least 80% of the liquid crystal droplets have a droplet diameter of 0.7 to 1.3 micrometers, the content of the liquid crystal droplets being 40 to 80% by weight of the film,
    (b) the thickness d (micrometer) of the liquid crystal film is 5 to 50 micrometers,
    (c) the applied voltage $V_{0.7}$ (V) is less than 1.0 d when light transmittance is 70%,
    (d) the driving voltage $V_{90}$ (V) in d = 10 micrometers and the average droplet diameter R (micrometers) of the liquid crystal droplets meet the following relationship

$V_{90} > 1 \ (R-1.8)^2 + 4$, (e) saturated light transmittance ($T_{100}$) in d = 10 micrometers is at least 80% and light transmittance ($T_{7V}$) in applying a voltage of 7 V is at least 80% of $T_{100}$
        said light-transmitting resin matrix having a refractive index within ±0.05 of the ordinary light refractive index of the liquid crystal droplets and containing 1 to 20% by weight of a fluorine atom.

2. The liquid crystal film of claim 1 wherein the light-transmitting resin is a polymer of a monomer mixture comprising a polymerizable monomer having surface activity and a hydrophilic polymerizable monomer containing a hydroxyl group.

3. The liquid crystal film of claim 2 wherein the polymer is an acrylic polymer.

4. The liquid crystal film of claim 2 wherein the polymerizable monomer having surface activity is an acrylic monomer represented by the formula wherein
$R^1$ denotes a hydrogen atom or a methyl group,
$R^2$ denotes a alkylene group having 2 to 3 carbon atoms,
$R_3$ denotes a liner, branched, alicyclic or aromatic hydrocarbon group having 5 to 20 carbon atoms, and
n is an integer of 2 to 12.

5. The liquid crystal film of claim 4 wherein the polymerizable monomer having surface activity is phenoxyoligoethylene oxide acrylate represented by the formula wherein
$R_4$ denotes a hydrogen atom or an alkyl group having 1 to 10 carbon atoms, and
n is an integer of 2 to 12.

6. The liquid crystal film of claim 2 wherein the hydrophilic monomer containing the hydroxyl group is a hydroxyl group-containing (meth)acrylate monomer represented by the formula $R^1$ denotes a hydrogen atom or a methyl group, and
$R^5$ denotes an alkylene group having 1 to 5 carbon atoms.

7. The liquid crystal film of claim 2 wherein the monomer mixture further contains a fluorine-containing polymerizable monomer.

8. The liquid crystal film of claim 7 wherein refractive index of the polymer obtained by homopolymerizing the fluorine-containing polymerizable monomer is 1.3 to 1.45.

9. The liquid crystal film of claim 8 wherein the fluorine-containing polymerizable monomer is a fluorine-containing (meth)acrylate monomer represented by the formula wherein
$R^1$ denotes a hydrogen atom or a methyl group,
$R_f$ denotes a mono- or poly-fluoroalkyl group having 1 to 8 carbon atoms and containing at least 1 fluorine atom.

10. The liquid crystal film of claim 2 wherein the monomer mixture further contains a polyfunctional polymerizable monomer having two or more (meth)acrylate groups as functional groups.

11. The liquid crystal film of claim 10 wherein the polyfunctional polymerizable monomer is a polyfunctional (meth)acrylate monomer represented by the formula wherein
$R^1$ denotes a hydrogen atom or a methyl group,
Y denotes a 2 to 6-valent organic radical which is selected from the group consisting of ethyleneglycol, di(meth)acrylate, trimethylol-propanetri(meth)acrylate, pentaerythritol tri(meth)acrylate, tris(acryloxyethyl) isocyanurate, pentaerythritol tetraacrylate, urethane acrylates and di-2,2,2-tri(acryloxymethyl) ethyl p-phenylenedicarbamate, and
m is an integer of 2 to 6.

12. The liquid crystal film of claim 10 wherein the content of the polyfunctional monomer is 5% by weight or less.

13. The liquid crystal film of claim 2 wherein the polymerization temperature of the monomer mixture is higher than the phase transition temperature of the liquid crystal.

14. The liquid crystal film of claim 2 wherein the monomer mixture contains a heat polymerization initiator and a photopolymerization initiator.

15. The liquid crystal film of claim 14 wherein the polymerization of the monomer mixture is performed in at least two stages of heat polymerization and ultraviolet irradiation polymerization.

16. The liquid crystal film of claim 1 wherein the liquid crystal is a nematic liquid crystal.

17. The liquid crystal film of claim 12 wherein the nematic liquid crystal is composed of at least one cyanobiphenyl-type liquid crystal compound.

18. The liquid crystal film of claim 1 wherein the liquid crystal film is formed by phase separation.

19. An electro-optical device made from the liquid crystal film of claim 1.

* * * * *

UNITED STATES PATENT AND TRADEMARK OFFICE
CERTIFICATE OF CORRECTION

PATENT NO. : 5,378,391
DATED : January 3, 1995
INVENTOR(S) : Kenji NAKATANI et al.

It is certified that error appears in the above-indentified patent and that said Letters Patent is hereby corrected as shown below:

On the cover page of the patent, the left hand column in Section [73]

Assignee: change "Teijim" to read --Teijin--.

Signed and Sealed this

Eighteenth Day of April, 1995

Attest:

BRUCE LEHMAN

Attesting Officer

Commissioner of Patents and Trademarks